Figure 1:
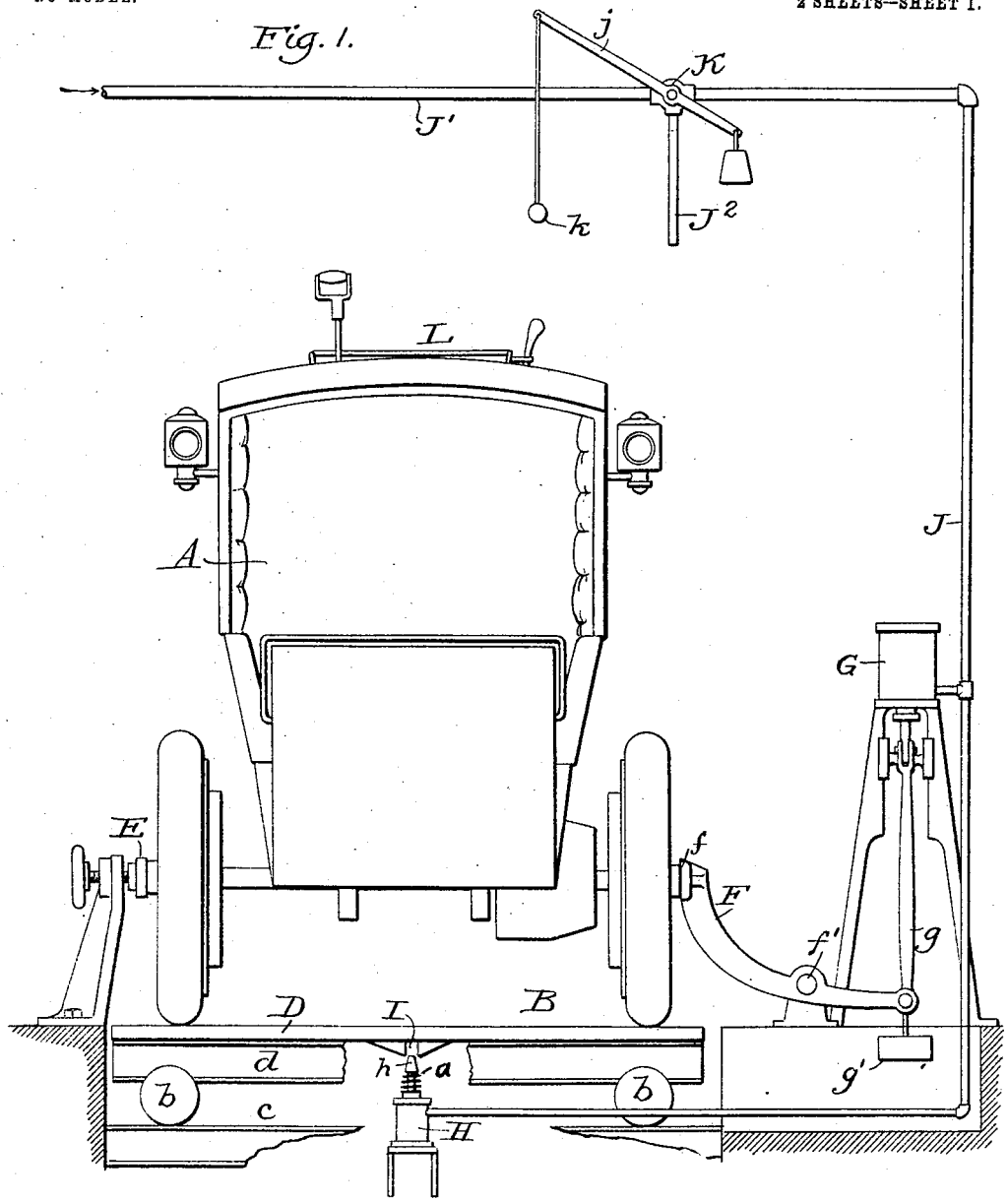

No. 772,030. PATENTED OCT. 11, 1904.
G. H. CONDICT.
APPARATUS FOR LOADING MOTOR VEHICLES.
APPLICATION FILED JAN. 3, 1899.
NO MODEL. 2 SHEETS—SHEET 1.

WITNESSES
James F. Duhamel
Henry G. Fiske

INVENTOR
George Herbert Condict,
BY
Frankland Jannus
ATTORNEY

No. 772,030. PATENTED OCT. 11, 1904.
G. H. CONDICT.
APPARATUS FOR LOADING MOTOR VEHICLES.
APPLICATION FILED JAN. 3, 1899.
NO MODEL. 2 SHEETS—SHEET 2.
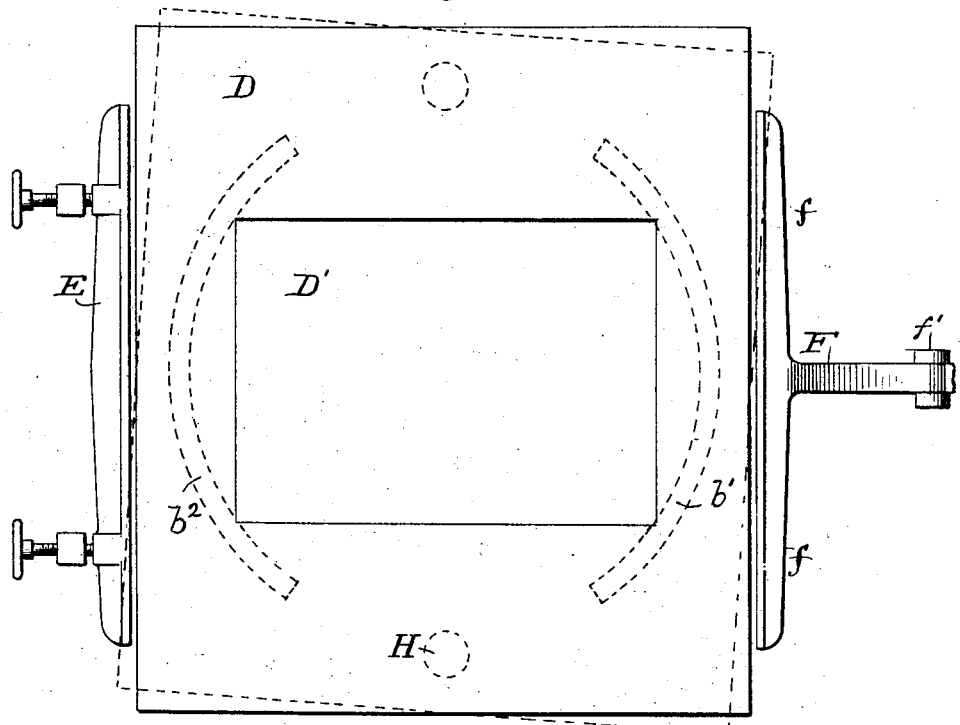
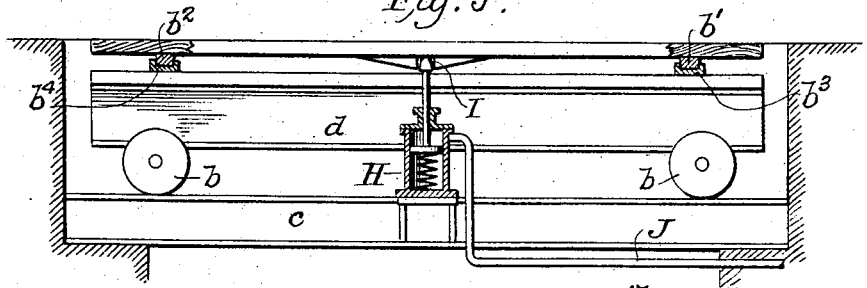
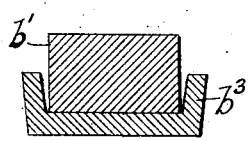 
WITNESSES
James F. Duhamel
Henry G. Fiske
INVENTOR
George Herbert Condict,
BY
Frankland Jannus
ATTORNEY No. 772,030. Patented October 11, 1904.

UNITED STATES PATENT OFFICE.

GEORGE HERBERT CONDICT, OF NEW YORK, N. Y., ASSIGNOR, BY MESNE ASSIGNMENTS, TO MORTON TRUST COMPANY, TRUSTEE, A CORPORATION OF NEW YORK.

APPARATUS FOR LOADING MOTOR-VEHICLES.

SPECIFICATION forming part of Letters Patent No. 772,030, dated October 11, 1904.

Application filed January 3, 1899. Serial No. 700,898. (No model.)

*To all whom it may concern:*

Be it known that I, GEORGE HERBERT CONDICT, a citizen of the United States of America, and a resident of the city of New York, county of New York, and State of New York, have invented certain new and useful Improvements in Apparatus for Loading Motor-Vehicles, of which the following is a specification.

My invention relates to motor-vehicles of the type which are electrically propelled, the current being furnished by a group of storage batteries carried by the vehicle and which are replaced when exhausted by a similar group freshly charged.

The invention comprises improvements in means for mechanically placing the vehicle in the desired position for loading or unloading.

In the accompanying drawings, Figure 1 is a view in elevation, showing a vehicle upon a loading-platform and means for positioning the same. Fig. 2 is a plan view of the loading-table of Fig. 1. Fig. 3 is a side elevation of the loading-table shown in Fig. 2. Figs. 4 and 5 are details relating to the loading-table.

In said drawings, Fig. 1, A is a vehicle to be placed in position to receive or discharge a tray of storage batteries. B is the laterally-movable loading-table, which is supported upon wheels $b$ $b$, running upon the track $c$. The top D of the loading-table B is supported upon girders $d$, which are provided with suitable bearings for carrying wheels $b$. The loading-table B moves laterally as a whole upon the wheels $b$; but the top D is also arranged to have some rotary movement upon its support, as is better shown in Figs. 2, 3, 4, 5. E is an adjustable buffer, which is preferably in form of a rail, Fig. 2, against which the hubs of the wheels of one side of the vehicle A can be stopped. A pivoted lever F, having arms $f$ $f$ extending laterally therefrom to engage the hubs of the other side of the vehicle, is pivoted upon a bearing $f'$ and is connected at its inner end by a suitable rod $g$ with a piston in the cylinder G, which when operated will force the lever F against the vehicle to push it over against the buffer E or retract the same. When the pressure is released from cylinder G, the weight of the parts will retract the lever F, or an extra weight $g'$ may be added. H is a second cylinder, the piston of which is connected with a stop $h$, which is normally held upward, as by spring $a$, to engage a catch I upon the table-top D, so that the table may be firmly held in position while the vehicle is being run onto it. The pistons in the cylinders G H are moved by water, air, or steam, which is supplied simultaneously thereto through pipe J, connected to both. A three-way cock K is connected to the pipe J and provided with a counterweighted operating-lever $j$, having a suitable handle $k$ extending to a point within reach of the driver of the vehicle when in his seat L. In the position indicated the cock K closes the supply-pipe J', which extends thereto from the source of motor fluid, and opens communication between the pipe J, which extends from said cock K to the cylinders G H, through exhaust-pipe J², also connected to said cock. When the lever $j$ is pulled down, the exhaust-pipe J² is cut off and the motor fluid passes through pipe J', cock K, and pipe J to the cylinders G H, drawing down and releasing the stop $h$, so that the table B is free to be moved, together with the vehicle, by the operation of the piston in cylinder G and movement of the lever F. As these movements are only required while the vehicle is being discharged and reloaded, which operation consumes but a few minutes, the driver retains his seat and holds down the lever $j$ until his vehicle is reloaded, when by releasing said lever it will return to first position and exhaust the cylinders G H, when the vehicle can at once be run off from the table.

In Fig. 2, D is the top of the table B, which, as indicated, is formed with a large central opening D', which while supporting the wheels of the vehicle admits of the tray of batteries being elevated from below into engagement with the body of the vehicle upon the table. The loading-table B as a whole moves laterally in a suitable pit in order that when the centering mechanism presses against the hubs of the wheels the vehicle and the table will be moved together until the opposite hubs engage the adjustable buffer on the other side. The table and vehicle moving together avoids all friction between the tires of the vehicle and the top of the table. In order, however, to still more perfectly accomplish this end, the top D of the table is mounted upon circular ways upon its support, so that it is a turn-table, having, however, under these conditions but a limited extent of rotary movement, due to the fact that it is located in a pit, so as to come even with the adjacent floor.

It is seldom possible to run the vehicle upon the table in such position that its hubs will be absolutely parallel to the centering apparatus; but by so constructing the top of the table that it can turn upon a central vertical axis the first effect of the centering apparatus will be to engage the nearest hub and turn the table and vehicle until the other hub comes in contact therewith also, when the vehicle and table will be moved laterally together.

In Fig. 4 I have shown bars $b' b^2$, which are segments of the common circle and rest in similarly-curved ways $b^3 b^4$, secured upon the transverse supports of the table, as indicated in dotted lines in Fig. 2. A section of one of the bars and its way is shown on enlarged scale in Fig. 4. Two curved ways $b^3 b^5$, similar to $b^3 b^4$, may be used, however, at each side of the table, as indicated in Fig. 5, with rollers $b^6$ between them to lessen the friction.

The table-top D will not ordinarily be required to turn upon its vertical axis more than a small part of a circle, to accommodate which the pit in which the table is located is made large enough to accommodate such movement, the wheels of the vehicle being prevented from running into the pit by the adjustable buffer E at one side and the arms $f f$ of the centering-lever upon the opposite side, the vehicle being always run onto the table in as nearly the desired position as possible.

The construction which is illustrated in the drawings and set forth in the foregoing description may be modified in many of its details without departing from invention. I therefore do not limit myself to the exact arrangement shown and described and referred to in the appended claims.

Having described my invention, what I claim is—

1. The combination with a vehicle to be loaded and a laterally-movable loading-table adapted to sustain the vehicle and having a rotatable portion upon which the vehicle rests, of means engaging the vehicle and acting to turn it and the table into position parallel therewith and for moving the vehicle and table laterally into desired position.

2. The combination of a laterally-movable turn-table adapted to receive a vehicle to be loaded, and mechanical means acting laterally against the vehicle to move the same together with the table laterally into desired position.

3. In a positioning apparatus, an object to be adjusted into position, supporting mechanism comprising frame or platform, means for engaging the object to be positioned, lateral and rotary free-movement mounting for said supporting mechanism.

4. In a positioning apparatus, an object to be adjusted into position, means for engaging the object to be positioned, supporting mechanism comprising a rotary member and a laterally-movable member, and an adjustable holding device for said rotary member.

5. In a dirigible vehicle-positioning apparatus, a movable support for a vehicle coacting with adjacent fixed flooring to receive said vehicle, means for holding said movable support in definite relation with said fixed flooring during the movement of said vehicle thereupon, and means to release said support to permit free floating.

6. The combination with a laterally-movable turn-table and a latch for holding said table in position to receive the vehicle, of means adapted to impart rotary and horizontal movement thereto, and means for releasing the latch and operating the table and vehicle moving apparatus simultaneously.

7. The combination with a vehicle and a laterally-moving table, a latch to hold the same in receiving position, apparatus for placing the vehicle and table into desired position, means for actuating the placing apparatus and releasing the latch simultaneously, and a controller located within reach from the vehicle.

8. The combination with a laterally-movable turn-table, a vehicle adapted to be sustained thereby, mechanism for imparting to the table and vehicle lateral and rotary movement, a latch normally holding the table in position to receive the vehicle, and a controlling device for operating the latch and table-moving mechanism simultaneously, said controlling mechanism located within reach of the driver of the vehicle.

9. In combination in a vehicle-positioning apparatus, a vehicle to be positioned, a floating platform, controllable devices to force the vehicle into position, and means within reach of an occupant of the vehicle to control said devices.

10. In combination in a positioning apparatus for a dirigible vehicle, a vehicle, a movable platform, means to engage said vehicle and force it into position, controllable mechanism to operate said means, and a device accessible from the operator's seat of the vehicle to release the vehicle.

11. In combination in a vehicle-positioning apparatus, a vehicle to be positioned, devices laterally of said vehicle adapted to engage the hubs of said vehicle, and cause the same to move into a predetermined position.

12. In a vehicle-centering apparatus, a vehicle to be positioned, lateral bars engaging the hubs of said vehicle and power connections to move said lateral bars and center said vehicle.

13. In combination in a vehicle-centering apparatus, a vehicle to be positioned, a platform, horizontal lateral projections or protrusions on said vehicle, centering devices mounted laterally of said apparatus, said centering devices engaging said projections or protrusions, and operative connections to cause the vehicle to assume a predetermined position.

14. In a vehicle-positioning apparatus, supporting means for a vehicle, a stop or buffer laterally of said apparatus, and means for adjusting said stop or buffer.

15. In a vehicle-positioning apparatus, supporting means for a vehicle, a movable stop or buffer laterally of said apparatus, and mechanical means for moving said buffer.

16. In a vehicle-positioning apparatus, a movable supporting means for a vehicle, bars laterally of said apparatus, one of said bars embodying adjusting devices.

17. In combination in a vehicle-positioning apparatus, a movable floor, a fixed bar or buffer at one side of said apparatus, and a movable bar or buffer on the other side of said apparatus.

18. In combination in a vehicle-centering apparatus, a horizontally-moving support for a vehicle, a laterally-adjustable buffer to engage one side of said vehicle, and a movable centering-buffer to engage the other side of said vehicle.

19. In a vehicle-positioning apparatus, a horizontally-movable floor to support a vehicle, parts laterally of said apparatus for engaging said vehicle, and lever-operated connections for moving said laterally-engaging parts.

20. In a positioning apparatus for a dirigible vehicle, a movable floor or support for said vehicle, and members to engage said vehicle above the level of the floor and independent of said floor for engaging and "centering" the vehicle.

21. In a vehicle centering and paralleling apparatus, a fixed lateral buffer or stop and means for horizontally adjusting the same.

22. In an apparatus for centering and paralleling a dirigible vehicle, a fixed lateral buffer-bar and a movable lateral buffer-bar.

23. In an apparatus for centering and paralleling a dirigible vehicle, a movable lateral buffer or stop, and means for moving the same horizontally.

24. In combination in a vehicle-positioning apparatus, mechanism for centering the vehicle, combining means for paralleling said vehicle with the centering mechanism and a floating floor, said floating floor and said paralleling means coöperating, whereby the vehicle will be adjusted in alinement with the centering apparatus without the abrasion of the tires upon the surface of the floor.

25. In combination in a vehicle-positioning apparatus, a movable floor, parallel lateral bars independent of said floor and adapted to engage said vehicle, said floor susceptible of a turning movement to move with the vehicle upon the paralleling of said vehicle with the centering apparatus.

26. In a vehicle-centering apparatus, a vehicle to be centered, a movable platform, means to laterally engage said vehicle and move it into alinement, said movable floor on a level with the surrounding floor, and a limited rotary-movement mounting for said floor.

27. In a vehicle-centering apparatus, a vehicle to be centered, means laterally of the apparatus to engage said vehicle and move it into a predetermined position, a movable floor, an opening wholly within said floor-space, and the supports for said flooring arranged whereby an unobstructed access is had through said floor to the under part of said vehicle.

28. In a vehicle-centering apparatus, a vehicle to be centered, means to laterally engage said vehicle and move it into a predetermined position, a movable support or floor and an unobstructed opening in a one-piece section thereof, as and for the purpose described.

29. In combination in a vehicle-handling apparatus or the like, movable flooring or other support for a pair of wheels and coöperating means whereby upon a lateral movement of said support said vehicle is locked longitudinally.

Signed by me at New York, N. Y., this 30th day of December, 1898.

GEORGE HERBERT CONDICT.

Witnesses:
   J. KENNEDY,
   FRANKLAND JANNUS.